(No Model.)

H. W. LUSK.
NUT LOCK.

No. 508,177.

Patented Nov. 7, 1893.

WITNESSES
E. H. Bates
Jas. B. Clarke

INVENTOR
H. W. Lusk
by Wm. H. Bates, Attorney

UNITED STATES PATENT OFFICE.

HARVEY W. LUSK, OF MONMOUTH, ILLINOIS.

NUT-LOCK.

SPECIFICATION forming part of Letters Patent No. 508,177, dated November 7, 1893.

Application filed July 28, 1893. Serial No. 481,785. (No model.)

*To all whom it may concern:*

Be it known that I, HARVEY W. LUSK, of Monmouth, in the county of Warren and State of Illinois, have invented a new and useful Improvement in Nut-Locks, of which the following is a full, clear, and exact description of the same, reference being had to the accompanying drawings, forming a part of this specification.

Figure 1:
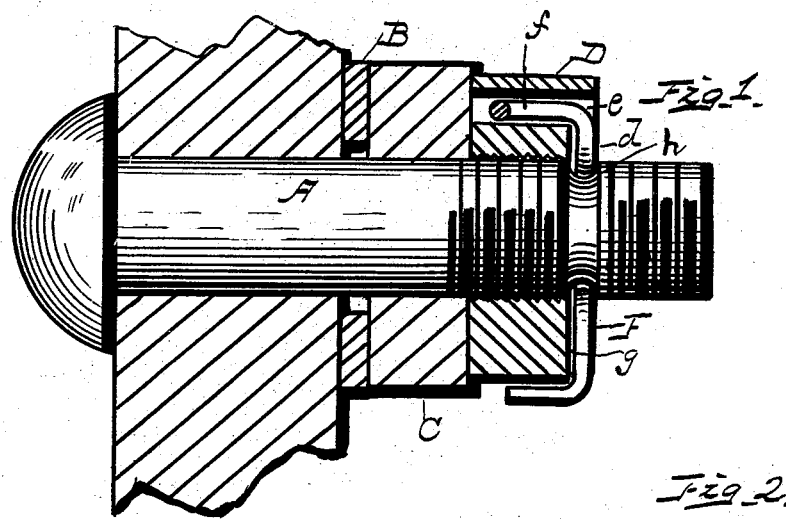
Figure 2:
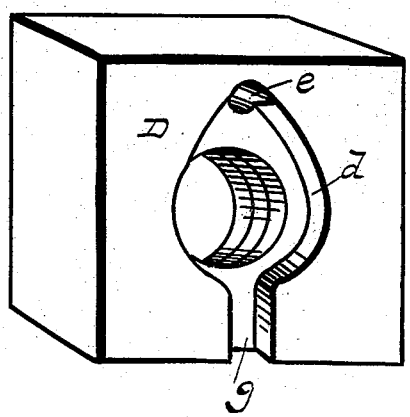
Figure 3:
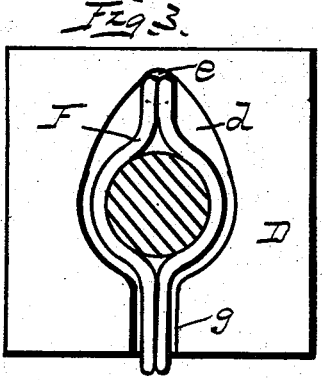
Figure 4:
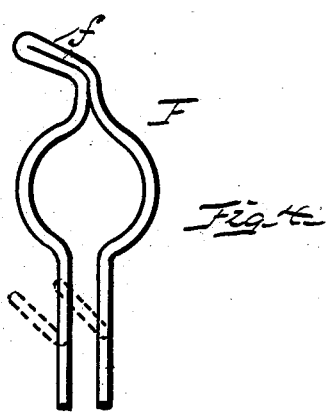

In the drawings Figure 1 represents a vertical sectional view of my improved nut lock. Fig. 2 is a perspective view of the nut. Fig. 3 is a face view, the bolt being in section, and Fig. 4 is a perspective view of the fastener.

Similar letters of reference refer to similar parts in the several views.

The bolt A, washer B, and nut C are all of any well known or preferred form.

D, represents the locking nut which in connection with locking stirrup F embodies my improvement. The nut D, is countersunk or recessed on one of its faces as shown at $d$. and has a small orifice $e$, at one side. At the opposite side there is a slot or depression $g$. The purpose of these will be explained farther on.

F represents the locking stirrup. This is made of a strip of flat steel or of wire bent upon itself and having its central portion bent outward at an angle as shown at $f$ to enter the orifice $e$, for engagement therewith. The parallel portions or legs of the same are reversely curved so as to straddle the shank of the bolt and engage primarily a circular groove $h$ as shown in Fig. 1 in such manner as to prevent its removal therefrom except by "stripping" the bolt. The free ends of the legs are brought together so as to embrace the shank, and are continued downward into the slot $g$, where they join and are turned beneath the nut.

By the means set forth in the foregoing it will be perceived that what I have designated as the stirrup will, at the parts thereof lying in the countersink, engage with the walls thereof and the groove of the bolt and thus lock the nut effectually against rotation and this for the reason that it fits snugly against the walls of the orifice and the shank of the bolt.

Various changes may be made in the method of attaching the stirrup or key to the lock and this without departing from the spirit of my invention.

Having thus described my invention, what I claim as new, and desire to secure by Letters Patent, is—

A nut-lock consisting of a nut having a countersink in one of its faces, slots or openings upon opposite sides thereof and a stirrup or forked key engaging at its extremities with said slots or openings in said nut and having its reversely curved portions embracing the shank of the bolt and bearing against the walls of said countersink.

In testimony whereof I affix my signature in presence of two witnesses.

HARVEY W. LUSK.

Witnesses:
JOHN W. LUSK,
FRANK P. WYNN.